(12) United States Patent
Fukami et al.

(10) Patent No.: US 10,931,071 B2
(45) Date of Patent: Feb. 23, 2021

(54) WIRING MODULE AND CONNECTION MEMBER FOR WIRING MODULE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Yuuya Fukami, Mie (JP); Shinya Itou, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 2 days.

(21) Appl. No.: 16/346,343

(22) PCT Filed: Sep. 26, 2017

(86) PCT No.: PCT/JP2017/034627
§ 371 (c)(1),
(2) Date: Jun. 11, 2019

(87) PCT Pub. No.: WO2018/088044
PCT Pub. Date: May 17, 2018

(65) Prior Publication Data
US 2019/0296507 A1 Sep. 26, 2019

(30) Foreign Application Priority Data
Nov. 11, 2016 (JP) .............................. JP2016-220323

(51) Int. Cl.
*H01R 25/14* (2006.01)
*B60R 16/02* (2006.01)
(Continued)

(52) U.S. Cl.
CPC ........... *H01R 25/142* (2013.01); *B60R 16/02* (2013.01); *B60R 16/0207* (2013.01); *H01R 4/58* (2013.01); *H01R 13/70* (2013.01); *H01R 2201/26* (2013.01)

(58) Field of Classification Search
CPC ........ H01R 25/142; H01R 4/58; H01R 13/70; H01R 2201/206; H01R 13/7038; H01R 31/02; B60R 16/02; B60R 16/0207
(Continued)

(56) References Cited

U.S. PATENT DOCUMENTS 3,476,871 A * 11/1969 Erdle ..................... H02G 5/005
174/88 B
5,057,026 A * 10/1991 Sawai .................... H02B 1/207
439/43
(Continued)

FOREIGN PATENT DOCUMENTS

| JP | H1-212636 A | 8/1989 |
|---|---|---|
| JP | H10-016675 A | 1/1998 |

OTHER PUBLICATIONS

International Search Report, Application No. PCT/JP2017/034627, dated Dec. 26, 2017. ISA/Japan Patent Office.

*Primary Examiner* — Travis S Chambers
(74) *Attorney, Agent, or Firm* — Honigman LLP

(57) ABSTRACT

Provided is a wiring module for installation in a vehicle, including a first conductor plate that is connected to a first output end of a power storage device and formed of a flat electric conductor elongated in a longitudinal direction, and supplying electric power from the power storage device to an electric device. The wiring module further includes a connection member. The connection member is fitted to the first conductor plate. The connection member includes a first fitting portion, a second fitting portion, and a switch. The first fitting portion is fitted to the first conductor plate. The (Continued)

second fitting portion has a first terminal through which electric power is supplied to the electric device. The switch establishes and breaks electrical continuity between the first terminal and the first conductor plate.

15 Claims, 9 Drawing Sheets

(51) Int. Cl.
   *H01R 13/70* (2006.01)
   *H01R 4/58* (2006.01)
(58) Field of Classification Search
   USPC .................. 439/121, 76.2, 94, 207–216
   See application file for complete search history.

(56) References Cited

U.S. PATENT DOCUMENTS

| | | | |
|---|---|---|---|
| 5,645,455 A * | 7/1997 | Seki | H01R 13/405 |
| | | | 439/189 |
| 5,859,845 A | 1/1999 | Oniishi et al. | |
| 6,203,343 B1 * | 3/2001 | Chevassus-More | ......... |
| | | | B60R 16/0207 |
| | | | 174/72 B |
| 9,485,892 B2 * | 11/2016 | Nakata | H01B 7/08 |
| 10,315,592 B2 * | 6/2019 | Osada | B60R 16/0215 |
| 10,468,161 B2 * | 11/2019 | Kominato | B21D 7/14 |
| 2013/0249522 A1 * | 9/2013 | Satake | B60L 15/08 |
| | | | 323/304 |
| 2015/0349471 A1 * | 12/2015 | Maki | B60R 16/0215 |
| | | | 307/10.1 |
| 2018/0326928 A1 * | 11/2018 | Saito | B60R 16/0215 |
| 2018/0326931 A1 * | 11/2018 | Naganishi | H02G 3/16 |

* cited by examiner

WIRING MODULE AND CONNECTION MEMBER FOR WIRING MODULE

CROSS-REFERENCE TO RELATED APPLICATIONS

This application is the U.S. national stage of PCT/JP2017/034627 filed Sep. 26, 2017, which claims priority of Japanese Patent Application No. JP 2016-220323 filed Nov. 11, 2016, the contents of which are incorporated herein.

TECHNICAL FIELD

The present disclosure relates to a wiring module and a connection member for the wiring module.

BACKGROUND

More and more diverse types of electric devices are becoming used in vehicles, and with respect to electric power supplied to such electric devices, a higher current is becoming used. Thus, there is a technology that makes it possible to supply a high current using metal wiring (a conductor plate) formed of a plate-shaped electric conductor.

JP 2016-120901A discloses an automobile power supply device in which pieces of plate-shaped metal wiring are used. In this automobile power supply device, a battery and two pieces of metal wiring are provided. The battery is installed in an engine room of a vehicle body, for example. The two pieces of metal wiring are plate-shaped, and are respectively connected to a positive terminal and a negative terminal of the battery. These pieces of metal wiring extend from the engine room to a vehicle interior.

Moreover, a plurality of electric devices are provided in the vehicle body. Each of the plurality of electric devices is connected to the pieces of metal wiring at positions that are the closest to the electric device via a wire harness. For example, a wire harness is connected to a piece of metal wiring using a bolt. Thus, electric power can be supplied from the battery to the electric devices.

However, since the pieces of metal wiring are plate-shaped electric conductors, a switching element, such as a relay, for turning on and off electric power to an electric device cannot be provided thereon. Moreover, although a method is conceivable in which the relay is disposed on the electric device, this method makes it no longer possible to simplify the electric device.

Also, a configuration is well-known in which each piece of metal wiring is divided and the divided sections are connected through bolting as joined plates. However, this configuration has the problem in that the ease of assembly that is performed by a worker is poor.

Therefore, it is an object of the present disclosure to provide a wiring module that can supply or interrupt electric power to an electric device while facilitating the connection between a conductor plate and the electric device.

SUMMARY

A first aspect of a wiring module is a wiring module for installation in a vehicle, including a first conductor plate that is connected to a first output terminal of a power storage device and formed of a flat electric conductor elongated in a longitudinal direction, and supplying electric power from the power storage device to an electric device. The wiring module further includes a connection member. The connection member is fitted to the first conductor plate. The connection member includes a first fitting portion, a second fitting portion, and a switch. The first fitting portion is fitted to the first conductor plate. The second fitting portion has a first terminal through which the electric power is supplied to the electric device. The switch establishes and breaks electrical continuity between the first terminal and the first conductor plate.

A second aspect of the wiring module is the wiring module according to the first aspect and further includes a second conductor plate. The second conductor plate is connected to a second output terminal of the power storage device and formed of a flat electric conductor elongated in a longitudinal direction, and is different from the first conductor plate. The second conductor plate is laid on top of the first conductor plate in an insulated state. The second fitting portion further has a second terminal through which the electric power is supplied to the electric device. The connection member further includes a third fitting portion that is fitted to the second conductor plate. The second conductor plate is connected to the second terminal in the connection member.

A third aspect of the wiring module is the wiring module according to the first aspect and further includes a first signal line. The first signal line extends in the longitudinal direction. The first signal line is coupled to the connection member, and is connected to a control terminal of the switch in the connection member.

A fourth aspect of the wiring module is the wiring module according to the second aspect and further includes a first signal line. The first signal line extends in the longitudinal direction. The first signal line is provided at a location other than a space sandwiched between the first conductor plate and the second conductor plate, is coupled to the connection member, and is connected to a control terminal of the switch in the connection member.

A fifth aspect of the wiring module is the wiring module according to the fourth aspect, wherein the first signal line is disposed in contact with an outer surface of the first conductor plate, an outer surface of the second conductor plate, an outer surface of an insulator with which the first conductor plate is coated, or an outer surface of an insulator with which the second conductor plate is coated.

A sixth aspect of the wiring module is the wiring module according to the fourth aspect, wherein the first signal line is disposed spaced apart from an outer surface of the first conductor plate, an outer surface of the second conductor plate, an outer surface of an insulator with which the first conductor plate is coated, or an outer surface of an insulator with which the second conductor plate is coated.

A seventh aspect of the wiring module is the wiring module according to any one of the first to sixth aspects, wherein the connection member further has a first connecting conductor. The first connecting conductor is connected to the first conductor plate. The first connecting conductor is connected to the first terminal of the second fitting portion via the switch. The first connecting conductor presses the first conductor plate in a thickness direction of the first conductor plate while coming into contact with the first conductor plate in the thickness direction.

An eighth aspect of the wiring module is the wiring module according to the seventh aspect, wherein the first connecting conductor includes a pillar portion and a pair of beam portions. The pillar portion extends in the thickness direction. The pair of beam portions extend from the pillar portion in a width direction of the first conductor plate and oppose each other in the thickness direction with a space left therebetween. The pair of beam portions have respective contact protrusions that protrude so as to approach each other. The contact protrusions come into contact with the first conductor plate from opposite sides in the thickness direction.

A ninth aspect of the wiring module is the wiring module according to the first aspect and further includes a third conductor plate formed of a flat electric conductor. The third conductor plate is paired with the first conductor plate. The connection member includes a fourth fitting portion.

A tenth aspect of the wiring module is the wiring module according to the ninth aspect, wherein the connection member further has a first connecting conductor that connects the first conductor plate to the third conductor plate.

An eleventh aspect of the wiring module is the wiring module according to the tenth aspect, wherein the first connecting conductor comes into contact with and presses the third conductor plate in a thickness direction of the third conductor plate.

A twelfth aspect of the wiring module is the wiring module according to the second, fourth, fifth, or sixth aspect, wherein the connection member includes a substrate, a first connecting conductor, and a second connecting conductor. The first connecting conductor and the second connecting conductor are disposed on opposite sides to each other with respect to the substrate. The first connecting conductor connects the first conductor plate to a first wire. The second connecting conductor connects the second conductor plate to a second wire. The substrate has the first wire and the second wire. The first wire connects the first connecting conductor to the first terminal of the second fitting portion via the switch. The second wire connects the second connecting conductor to the second terminal of the second fitting portion.

A thirteenth aspect of the wiring module is the wiring module according to any one of the first to twelfth aspects and further includes a second signal line. The second fitting portion has a third terminal from which a signal is output to the electric device. The connection member further has a wire that connects the second signal line and the third terminal to each other.

A fourteenth aspect of the wiring module is the wiring module according to any one of the first to thirteenth aspects and further includes a flat signal conductor plate. The signal conductor plate extends in the longitudinal direction. The signal conductor plate transmits a multiplex signal that is multiplexed. The connection member has a control circuit. The control circuit is connected to the signal conductor plate and separates the multiplex signal.

A connection member for a wiring module is a connection member for an in-vehicle wiring module that supplies electric power from a power storage device to an electric device. The connection member includes a first fitting portion, a second fitting portion, and a switch. The first fitting portion is fitted to a first conductor plate that is connected to a first output terminal of the power storage device and formed of a flat electric conductor elongated in a longitudinal direction. The second fitting portion has a first terminal through which electric power is supplied to the electric device. The switch establishes and breaks electrical continuity between the first terminal and the first conductor plate.

Advantageous Effects of Disclosure

With the wiring module, it is possible to supply or interrupt electric power to an electric device while facilitating the connection between a conductor plate and the electric device.

DETAILED DESCRIPTION OF PREFERRED EMBODIMENTS

Configuration

Figure 1:
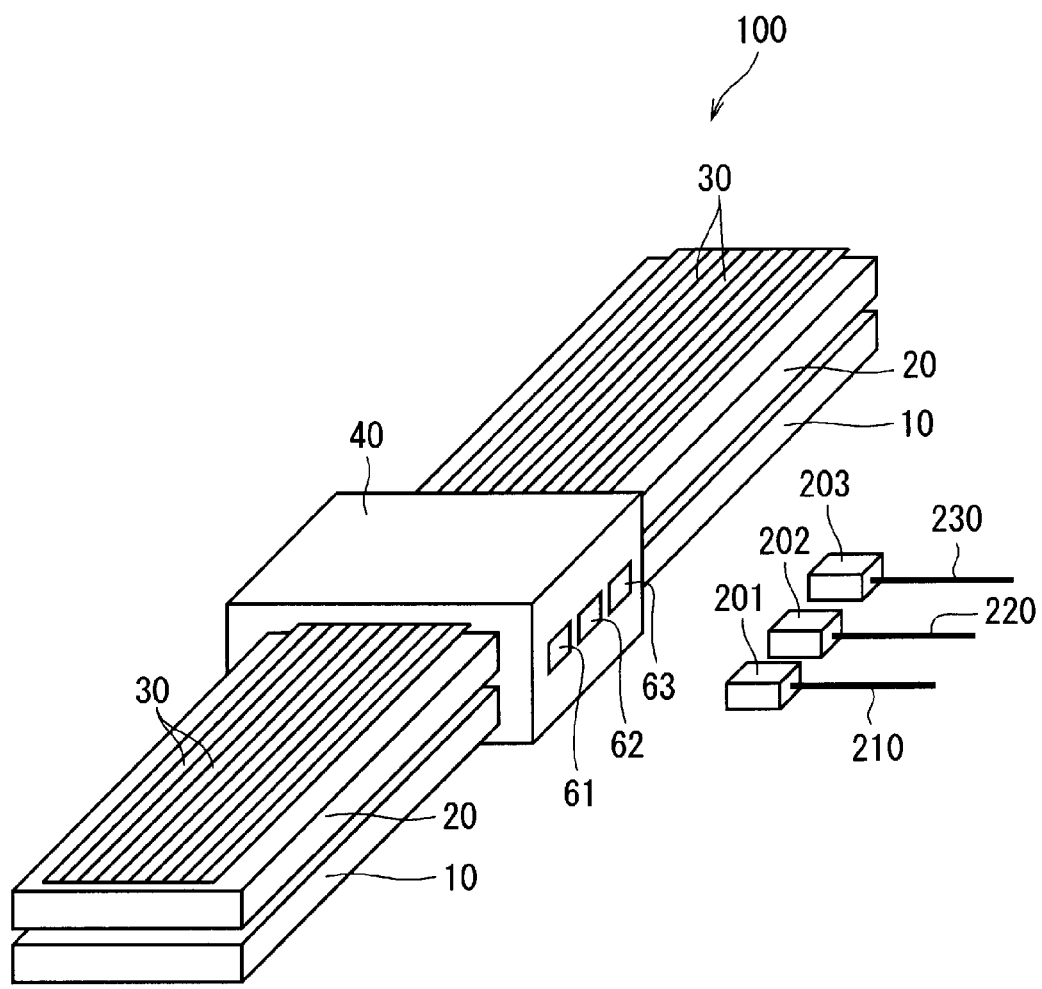
FIG. 1 is a perspective view schematically showing an example of a configuration of a wiring module.

FIG. 1 is a perspective view schematically showing an example of a configuration of an in-vehicle wiring module 100. The wiring module 100 is installed in a vehicle (e.g., automobile). The wiring module 100 includes conductor plates 10 and 20, a signal line group 30, and a connection member 40.

The conductor plate 10 is formed of a single continuous electric conductor, has an elongated shape extending in a longitudinal direction, and has a flat shape in a cross section that is perpendicular to the longitudinal direction. A conductor plate formed of an electric conductor such as copper or aluminum, which is an example of the electric conductor, can be used. For example, the conductor plate 10 has a rectangular shape, for example, in cross section. As used herein, the cross section is a cross section of a portion that has conductivity, and, for example, in the case of conductor plates 21 to 23 coated with an insulating coating, the insulating coating is not included in the cross section. The thickness of the conductor plate 10 can be appropriately set, but may be set to be at least 0.5 (mm) and not more than 1 (mm), for example. The width of the conductor plate 10 (width in a direction that is perpendicular to the longitudinal direction and a thickness direction) can also be appropriately set, but may be set to be at least 50 (mm) and not more than 100 (mm), for example.

The conductor plate 10 is formed of a material that has the property of establishing electrical continuity, and may be formed of a metal, for example. For example, a metal such as copper, a copper alloy, aluminum, or an aluminum alloy can be used as the material of the conductor plate 10.

The conductor plate 20 is formed of a single continuous electric conductor, has an elongated shape extending in a longitudinal direction, and has a flat shape in a cross section that is perpendicular to the longitudinal direction. Examples of the cross-sectional shape, size, and material of the conductor plate 20 are similar to those of the conductor plate 10.

The conductor plates 10 and 20 are arranged opposing each other in their thickness directions while being spaced apart from each other. Moreover, the conductor plates 10 and 20 extend in substantially the same direction. That is to say, the thickness directions of the conductor plates 10 and 20 are substantially the same, and the longitudinal directions of the conductor plates 10 and 20 are also substantially the same. Each of the conductor plates 10 and 20 may be coated with a predetermined insulator (e.g., a resin).

The conductor plates 10 and 20 are connected to a power storage device (e.g., battery or capacitor: see also FIG. 2) 500 installed in the vehicle, for example. In this case, the conductor plates 10 and 20 function as power supply lines. For example, the conductor plate 10 is connected to a high-potential side output terminal 510 of this power storage device 500, and the conductor plate 20 is connected to a low-potential side output terminal 520 of the power storage device 500. In this case, the conductor plate 20 can function as an earth (or ground).

Since the conductor plates 10 and 20 are arranged opposing each other, the direction of the current flowing through the conductor plate 10 is opposite to the direction of the current flowing through the conductor plate 20. Therefore, a magnetic flux induced by the current flowing through the conductor plate 10 and a magnetic flux induced by the current flowing through the conductor plate 20 cancel each other. Accordingly, electromagnetic noise caused by these currents is reduced. Note that since the electromagnetic noise can be reduced when the directions of the currents flowing through the conductor plates 10 and 20 are opposite to each other, the conductor plates 10 and 20 may also be arranged in positions in which the thickness direction of the conductor plate 10 intersects the thickness direction of the conductor plate 20.

The signal line group 30 extends in the longitudinal direction of the conductor plates 10 and 20, and is disposed on the side opposite to the conductor plate 10 with respect to the conductor plate 20. In the example in FIG. 1, signal lines contained in the signal line group 30 are arranged side-by-side in the width direction of the conductor plate 10, and all the signal lines extend in the longitudinal direction of the conductor plates 10 and 20.

Note that the signal line group 30 need not be disposed on the side opposite to the conductor plate 10 with respect to the conductor plate 20. The signal line group 30 may also be disposed on the side opposite to the conductor plate 20 with respect to the conductor plate 10. In short, it is preferable that the signal line group 30 is provided at a location other than a space sandwiched between the conductor plates 10 and 20. Thus, the distance between the conductor plates 10 and 20 can be set to be short, and electromagnetic noise radiation can be effectively reduced. For example, it is preferable that the signal line group 30 is disposed around conductor plates 10A and 20A that are laid one on top of the other. With this configuration, the signal line group 30 can be disposed on the conductor plates 10 and 20.

Moreover, it is preferable that the signal line group 30 is disposed so as to oppose the conductor plate 10 or 20 in the thickness direction of the conductor plate 10 or 20. With this configuration, the signal line group 30 can be disposed on a wide surface of the conductor plate 10 or 20, and therefore, it is easy to route the signal line group 30. Note that the signal line group 30 may be disposed on the wide surface of the conductor plate 10 or 20 via a predetermined insulator (e.g., a resin), or the signal line group 30 may be disposed in a state in which the signal line group 30 is spaced apart from an outer surface of the conductor plate 10 or 20 or an outer surface of a predetermined insulator (e.g., a resin) with which the conductor plate 10 or 20 is coated. That is to say, the signal line group 30 may be disposed in contact with or spaced apart from the outer surface of the conductor plate 10, the outer surface of the conductor plate 20, the outer surface of the insulator with which the conductor plate 10 is coated, or the outer surface of the insulator with which the conductor plate 20 is coated (these insulators may be resins, for example).

The conductor plates 10 and 20 are fitted to the connection member 40. An example of a specific structure will be described in detail later. The connection member 40 includes fitting portions 61 to 63. The fitting portions 61 to 63 are PCB (printed circuit board) connectors, for example, and are detachably coupled to connectors 201 to 203, respectively. Alternatively, the fitting portions 61 to 63 may be formed in a resin frame 400. Each of the connectors 201 to 203 is provided at one end of a corresponding one of wire groups 210 to 230, and the other ends of the wire groups are appropriately connected to respective electric devices (not shown). For example, an ECU (electronic control unit) including a control circuit, or a motor can be adopted as an electric device. The wire groups 210 to 230 and the connectors 201 to 203 can be realized as a wire harness.

Figure 2:
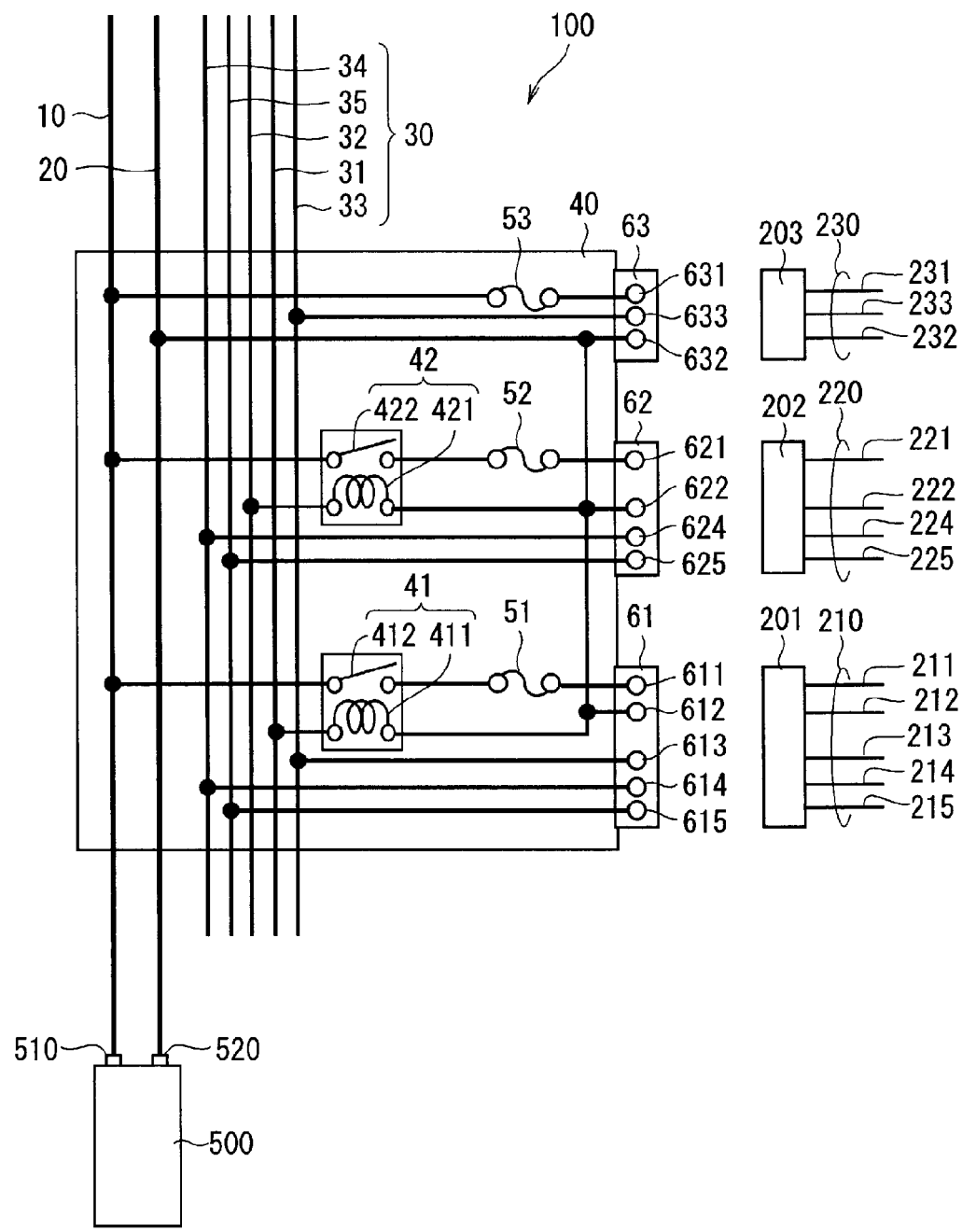
FIG. 2 is a diagram schematically showing an example of an internal configuration of the wiring module.

In a state in which the fitting portions 61 to 63 are coupled to the respective connectors 201 to 203, the connection member 40 can electrically connect the conductor plates 10 and 20 to the wire groups 210 to 230 as appropriate. For example, FIG. 2 is a diagram showing an example of an electrical internal configuration of the connection member 40. For example, the connection member 40 includes switches 41 and 42, fuses 51 to 53, and the fitting portions 61 to 63.

The fitting portion 61 has terminals 611 and 612. The terminal 611 is connected to the conductor plate 10 via the switch 41 and the fuse 51, for example. That is to say, the conductor plate 10 is connected to the terminal 611 in the connection member 40. The terminal 612 is connected to the conductor plate 20. That is to say, the conductor plate 20 is connected to the terminal 612 in the connection member 40.

In the case where the conductor plates 10 and 20 are connected to the power storage device 500, the terminals 611 and 612 function as power supply terminals. That is to say, the terminals 611 and 612 are the terminals through which electric power in the power storage device 500 is supplied to an electric device. In other words, electric power that is supplied from the power storage device 500 to the electric device is transmitted via the terminals 611 and 612. As a result of the fitting portion 61 being coupled to the connector 201, the power supply terminals 611 and 612 are connected to respective wires 211 and 212 contained in the wire group 210. This connection enables electric power from the power storage device 500 to be supplied to the electric device connected to the wires 211 and 212.

When a current of a predetermined value or more flows through the fuse 51, the fuse 51 interrupts the current flow. As a result, the electric device connected to the wires 211 and 212 can be protected from an overcurrent.

The switch 41 is a relay, for example, and establishes and breaks electrical continuity between the conductor plate 10 and the power supply terminal 611. That is to say, the switch 41 is capable of switching between the supply and stoppage of electric power to the electric device. In the example in FIG. 2, the switch 41 includes a coil 411 and a contact structure 412. The contact structure 412 is connected between the conductor plate 10 and the power supply terminal 611. When the contact structure 412 is in a closed state, it establishes electrical continuity between these components, and when in an open state, it electrically disconnects these components from each other.

With this wiring module 100, it is possible to appropriately connect the electric devices to the conductor plates 10 and 20 by coupling the connectors 201 to 203 to the fitting portions 61 to 63. Therefore, the connection to the electric devices can be facilitated. Moreover, since the connection member 40 includes the switches 41 and 42, the supply or interruption of electric power to the electric devices can be appropriately achieved.

The connection member 40 is also attached to the signal line group 30. In the example in FIG. 2, a plurality of signal lines 31 to 35 are shown as signal lines contained in the signal line group 30. The coil 411 is connected to the signal line 31 at one end and connected to the conductor plate 20 at the other end. The coil 421 is connected to the signal line 32 at one end and connected to the conductor plate 20 at the other end.

A controller (not shown) is connected to the signal line 31. The controller outputs a control signal that controls the switch 41 to the signal line 31. That is to say, the signal line 31 is a signal line that transmits the control signal. This control signal causes current to flow between the signal line 31 and the conductor plate 20 via the coil 411 or to be interrupted. When current starts flowing therebetween, the coil 411 starts generating a magnetic flux, which in turn acts on the contact structure 412 to switch between the open state and the closed state of the contact structure 412. As a result, the switch 41 establishes or breaks electrical continuity.

In FIG. 2, for example, the fitting portion 61 further has terminals 613 to 615, which are connected to the respective signal lines 33 to 35 in the connection member 40. Therefore, the terminals 613 to 615 function as signal terminals. As a result of the fitting portion 61 being coupled to the connector 201, the signal terminals 613 to 615 are connected to respective wires 213 to 215 contained in the wire group 210. Thus, electric devices (not shown) connected to the signal lines 33 to 35 can send and receive signals to and from the electric device connected to the wires 213 to 215.

The signal line 33 may be a signal line for transmitting a signal that indicates the speed of the vehicle, for example, and the signal lines 34 and 35 may be signal lines for transmitting signals that are used in an in-vehicle network (e.g., a CAN (controller area network)), for example.

The fitting portion 62 includes power supply terminals 621 and 622. In the connection member 40, the conductor plate 10 is connected to the power supply terminal 621 via the switch 42 and the fuse 52, for example. In the connection member 40, the conductor plate 20 is connected to the power supply terminal 622. As a result of the fitting portion 62 being coupled to the connector 202, the power supply terminals 621 and 622 are connected to respective wires 221 and 222 contained in the wire group 220. This connection enables electric power from the power storage device 500 to be supplied to an electric device connected to the wires 221 and 222. That is to say, the terminals 621 and 622 are terminals through which electric power in the power storage device 500 is supplied to the electric device. In other words, electric power that is supplied from the power storage device 500 to the electric device is transmitted via the terminals 621 and 622.

As is the case with the fuse 51, the fuse 52 is capable of protecting the electric device connected to the wires 221 and 222 from an overcurrent. The switch 42 is a relay, for example, and includes a coil 421 and a contact structure 422. The coil 421 is connected to the signal line 32 at one end and connected to the conductor plate 20 at the other end. The signal line 32 is a signal line that transmits a control signal that controls the switch 42. The coil 421 and the contact structure 422 are similar to the coil 411 and the contact structure 412, respectively.

In FIG. 2, for example, the fitting portion 62 further has signal terminals 624 and 625. The signal lines 34 and 35 are connected to the respective signal terminals 624 and 625 in the connection member 40. As a result of the fitting portion 62 being coupled to the connector 202, the signal terminals 624 and 625 are connected to respective wires 224 and 225 contained in the wire group 220. Thus, the electric devices connected to the signal lines 34 and 35 can send and receive signals to and from an electric device connected to the wires 224 and 225.

The fitting portion 63 includes power supply terminals 631 and 632, for example. In the connection member 40, the conductor plate 10 is connected to the power supply terminal 631 via the fuse 53, for example. In the connection member 40, the conductor plate 20 is connected to the power supply terminal 632. As a result of the fitting portion 63 being coupled to the connector 203, the power supply terminals 631 and 632 are connected to respective wires 231 and 232 contained in the wire group 230. This connection enables electric power from the power storage device 500 to be supplied to an electric device connected to the wires 231 and 232. That is to say, the terminals 631 and 632 are terminals through which electric power in the power storage device 500 is supplied to the electric device. In other words, electric power that is supplied from the power storage device 500 to the electric device is transmitted via the terminals 631 and 632. As is the case with the fuse 51, the fuse 53 is capable of protecting the electric device connected to the wires 231 and 232 from an overcurrent.

In FIG. 2, for example, the fitting portion 63 further has a signal terminal 633. The signal line 33 is connected to the signal terminal 633 in the connection member 40. As a result of the fitting portion 63 being coupled to the connector 203, the signal terminal 633 is connected to a wire 233 contained in the wire group 230. Thus, the electric device connected to the signal line 33 can send and receive signals to and from the electric device connected to the wire 233.

With this wiring module 100, it is possible to appropriately connect the power storage device 500 to a plurality of electric devices by coupling the fitting portions 61 to 63 to the connectors 201 to 203. Therefore, electric power can be appropriately supplied to the electric devices, and signals can be sent and received among a plurality of electric devices. Furthermore, since the wire groups 210, 220, and 230 are connected to the conductor plates 10 and 20 as well as the signal line group 30 using the fitting portions 61 to 63 and the connectors 201 to 203, the connection can be achieved with a high degree of reliability. Moreover, the connection using the fitting portions 61 to 63 and the connectors 201 to 203 is easy for a worker who performs the connection. That is to say, it is possible to easily connect the conductor plates 10 and 20 as well as the signal line group 30 to electric devices.

Moreover, since the connection member 40 has the switch 41, it is possible to switch between the supply and interruption of electric power to the electric device connected to the wires 211 and 212. With this configuration, it is possible to supply electric power to the electric device only when necessary, and therefore, power consumption can be reduced. The same holds true for the switch 42.

Wiring Module 100A

Figure 3:
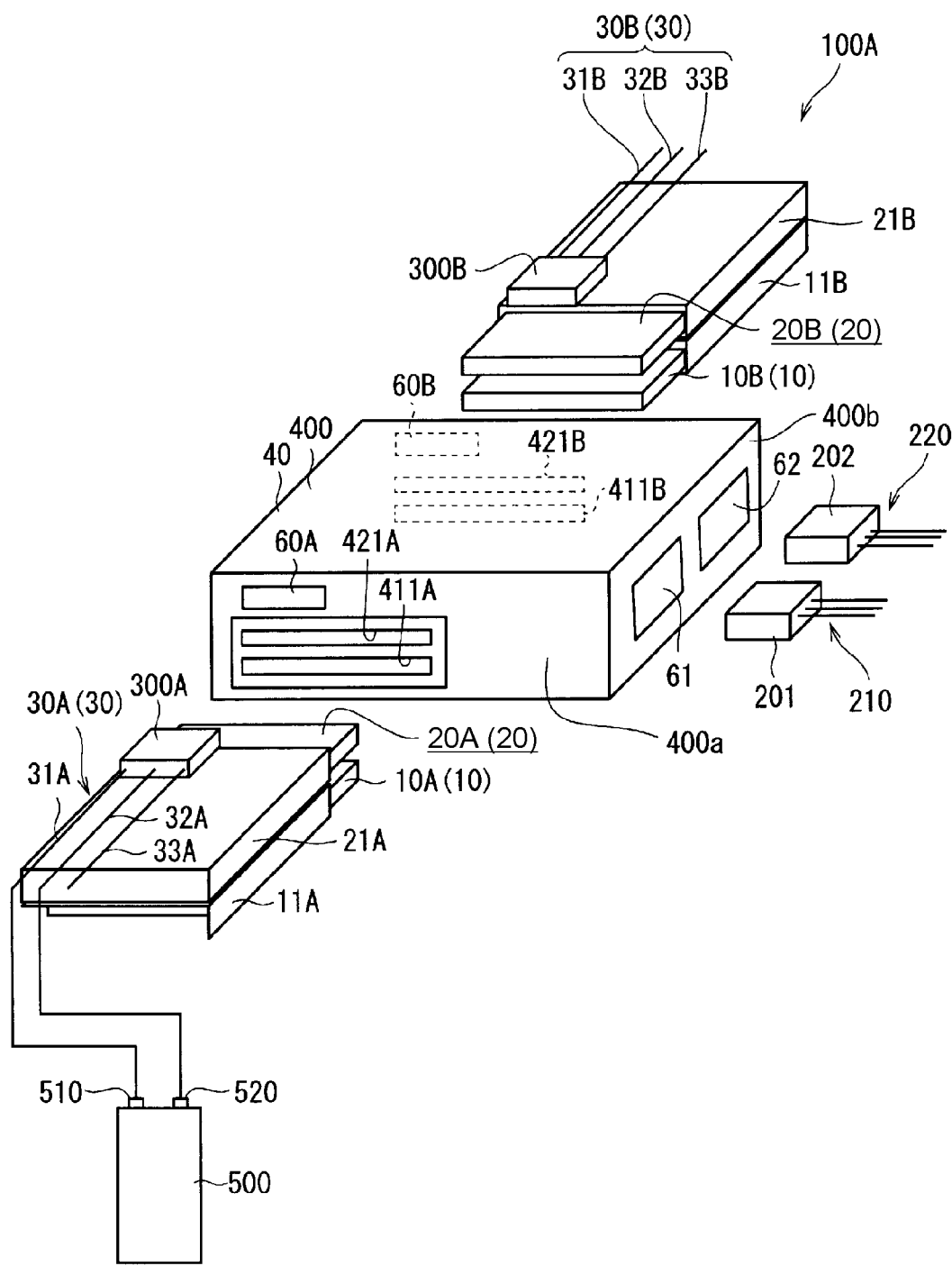
FIG. 3 is a perspective view schematically showing an example of a configuration of a wiring module.
Figure 4:
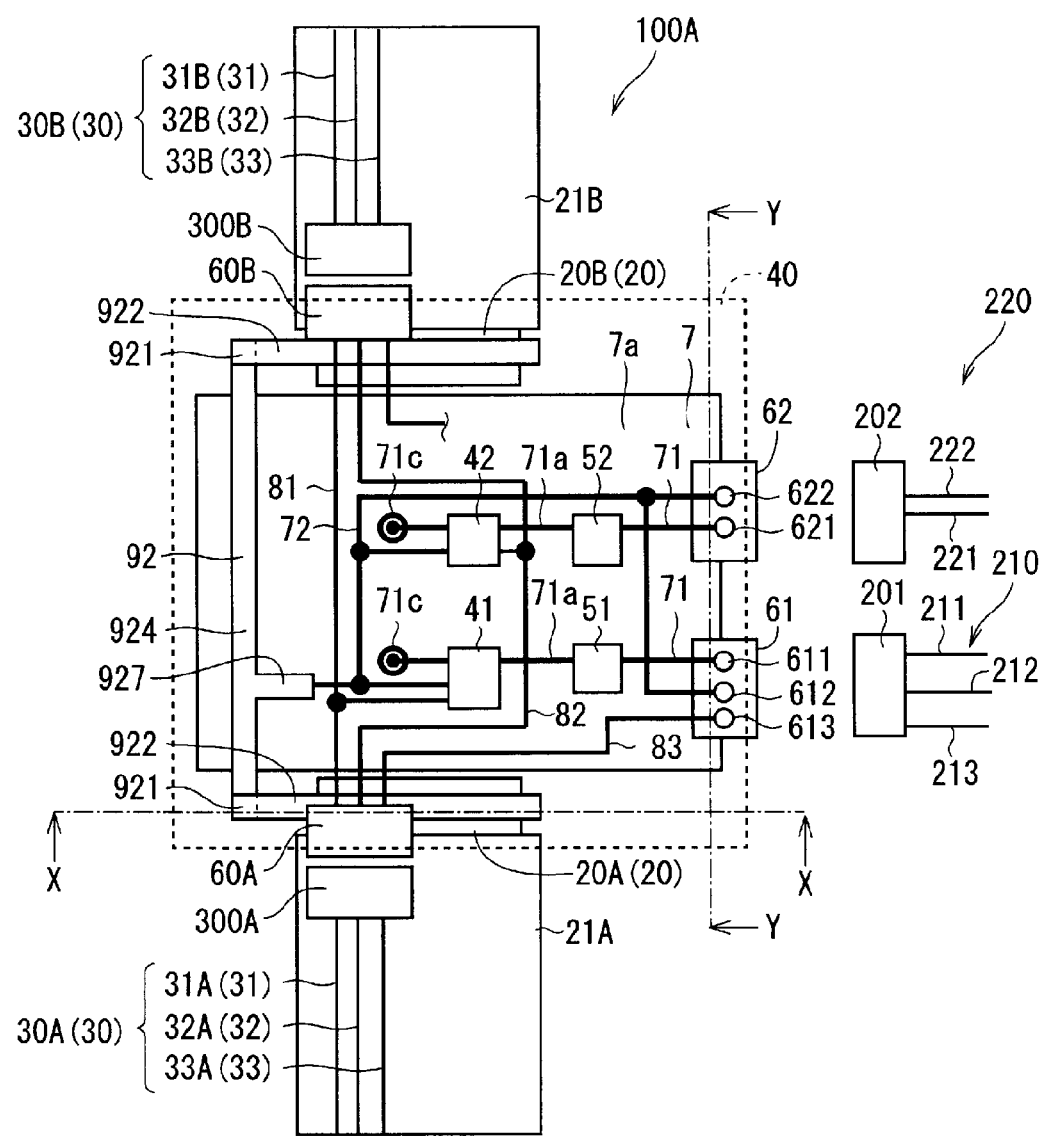
FIG. 4 is a top view schematically showing the example of the configuration of the wiring module.
Figure 5:
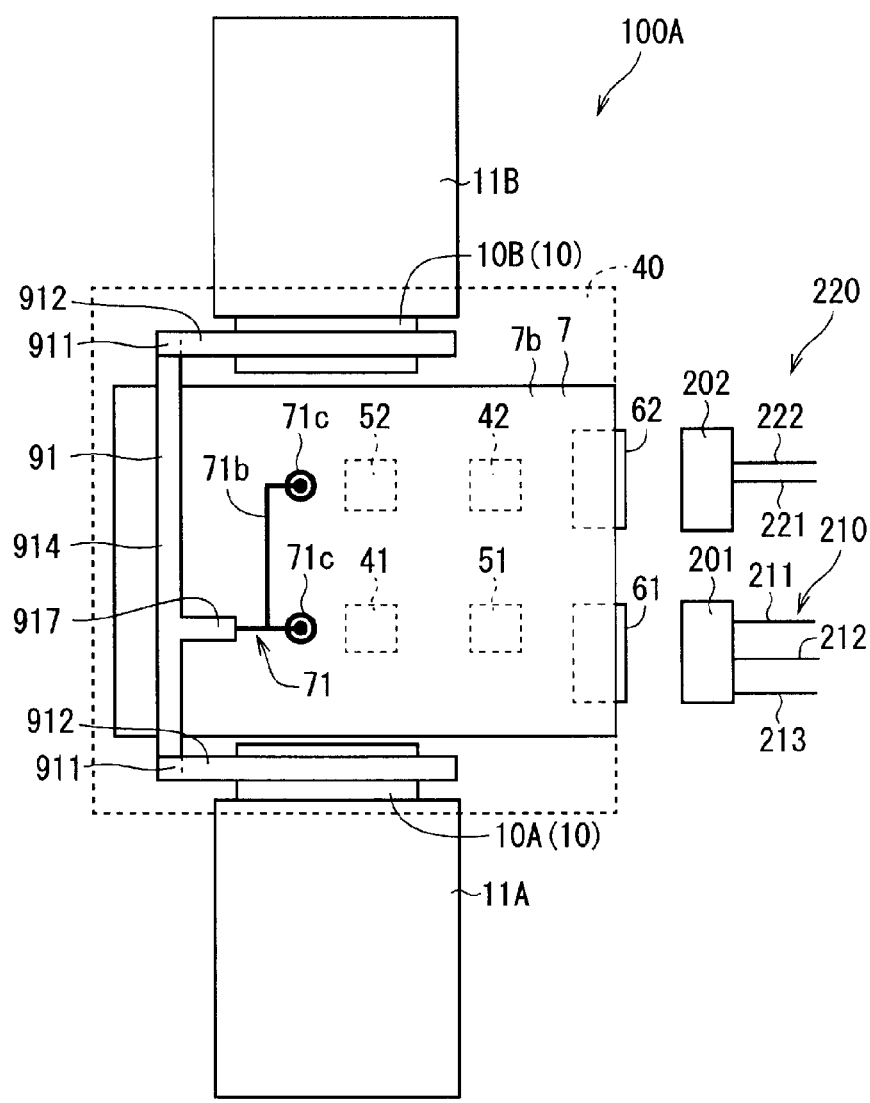
FIG. 5 is a bottom view schematically showing the example of the configuration of the wiring module.
Figure 6:
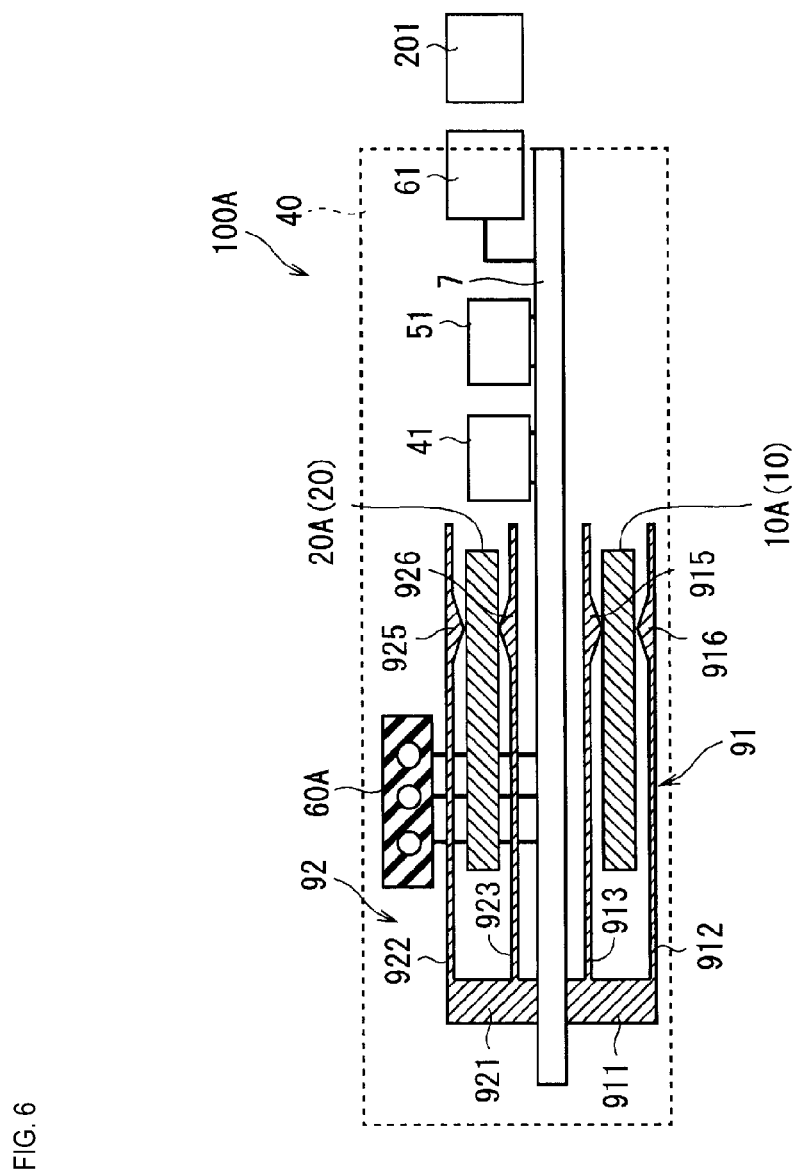
FIG. 6 is a cross-sectional view schematically showing the example of the configuration of the wiring module.
Figure 7:
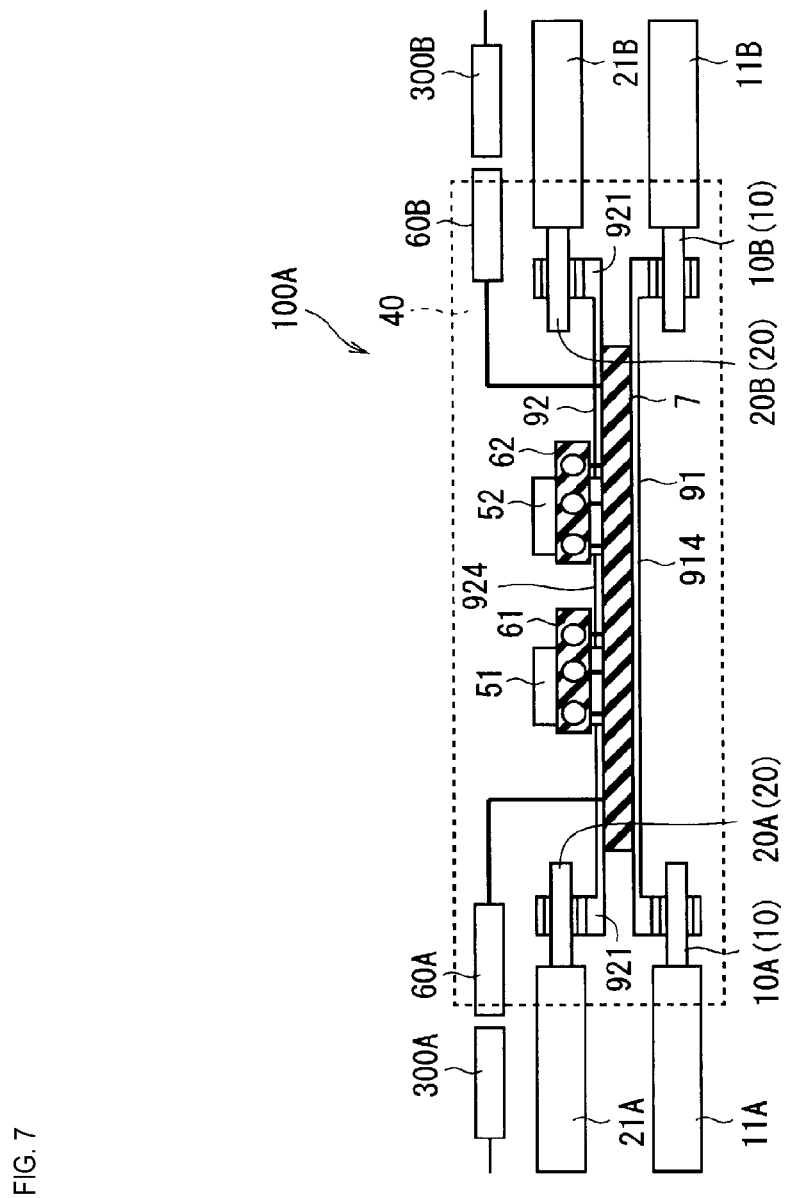
FIG. 7 is a cross-sectional view schematically showing the example of the configuration of the wiring module.

FIGS. 3 to 7 schematically show an example of a configuration of a wiring module 100A. The wiring module 100A is a specific example of the wiring module 100, for example. FIG. 3 is a perspective view schematically showing the example of the configuration of the wiring module 100A, and FIGS. 4 and 5 are a top view and a bottom view, respectively, schematically showing the example of the configuration of the wiring module 100A. FIGS. 6 and 7 schematically show cross sections taken along lines X-X and Y-Y, respectively, in FIG. 4. However, in FIGS. 3 to 7, for the sake of simplicity, an appropriately reduced number of signal lines of the signal line group 30 are shown, and the fitting portion 63 is omitted. Moreover, FIGS. 4 and 5 schematically show an example of an internal configuration of the connection member 40.

In the wiring module 100A, for example, conductor plates 10A and 10B that are paired with each other are provided as the conductor plate 10, and conductor plates 20A and 20B that are paired with each other are provided as the conductor plate 20. The pair of conductor plates 10A and 10B is detachably coupled to the connection member 40. As a result of this coupling, the connection member 40 electrically connects the pair of conductor plates 10A and 10B to each other. Similarly, the pair of conductor plates 20A and 20B is also detachably coupled to the connection member 40. As a result of this coupling, the connection member 40 electrically connects the pair of conductor plates 20A and 20B to each other.

For example, the connection member 40 has the resin frame 400. The resin frame 400 has a rectangular parallelepiped shape, for example. Fitting portions 411A and 421A for the conductor plates 10A and 20A are formed in a face 400a of the resin frame 400. The fitting portion 411A is fitted to the conductor plate 10A. Specifically, an end portion of the conductor plate 10A is fitted to the fitting portion 411A in the longitudinal direction of the conductor plate 10A. When viewed in the longitudinal direction of the conductor plate 10A, the fitting portion 411A has a flat shape (e.g., a rectangular shape), for example.

The fitting portion 421A is disposed adjacent to the fitting portion 411A in the thickness direction of the conductor plates 10A and 20A. The fitting portion 421A is fitted to the conductor plate 20A. Specifically, an end portion of the conductor plate 20A is fitted to the fitting portion 421A in the longitudinal direction of the conductor plate 20A. The fitting portion 421A has a similar shape to that of the fitting portion 411A.

The resin frame 400 is also provided with fitting portions 411B and 421B for the conductor plates 10B and 20B. The fitting portion 411B is fitted to the conductor plate 10B, and the fitting portion 421B is fitted to the conductor plate 20B. For example, these fitting portions 411B and 421B are formed in a face that opposes the face 400a. The fitting portions 411B and 421B are similar to the fitting portions 411A and 421A, and therefore a redundant description thereof is avoided.

The example in FIG. 3 also shows insulating coatings 11A, 21A, 11B, and 21B. The conductor plate 10A is coated with the insulating coating 11A except for at least the above-described end portion of the conductor plate 10A. The conductor plate 20A is coated with the insulating coating 21A except for at least the above-described end portion of the conductor plate 20A. The conductor plates 10B and 20B are also coated with the respective insulating coatings 11B and 21B in a similar manner to that of the insulating coatings 11A and 21A, except for at least end portions of the conductor plates 10B and 20B that are inserted into the connection member 40.

In the example in FIG. 3, the fitting portions 61 and 62 are provided in a face 400b of the resin frame 400. The face 400b is parallel to, for example, the longitudinal direction of the conductor plates 10 and 20, and opposes side surfaces of the conductor plates 10 and 20 in the width direction of the conductor plates 10 and 20, for example.

Referring to FIG. 4, the connection member 40 has a connecting conductor 92. The connecting conductor 92 has conductivity, and is formed of a metal, for example. The connecting conductor 92 may be a busbar. In a state in which the end portions of the conductor plates 20A and 20B are inserted into the connection member 40 (specifically, the fitting portions 411A and 421A), the connecting conductor 92 is electrically connected to both of the conductor plates 20A and 20B. That is to say, the conductor plates 20A and 20B are electrically connected to each other via the connecting conductor 92. For example, the connecting conductor 92 may come into contact with each of the end portions of the respective conductor plates 20A and 20B.

Referring also to FIG. 6, the connecting conductor 92 presses the conductor plate 20A in the thickness direction of the conductor plate 20A while coming into contact with the conductor plate 20A in the thickness direction. In other words, the connecting conductor 92 may be pressed against the conductor plate 20A. That is to say, the connecting conductor 92 may have a pressing structure. Similarly, the connecting conductor 92 presses the conductor plate 20B in the thickness direction of the conductor plate 20B while coming into contact with the conductor plate 20B in the thickness direction. In other words, the connecting conductor 92 may be pressed against the conductor plate 20B. With this configuration, it is possible to improve the quality of contact between the connecting conductor 92 and the conductor plates 20A and 20B. Hereinafter, an example of a specific structure will be described.

For example, the connecting conductor 92 includes a pillar portion 921 and a pair of beam portions 922 and 923. The pillar portion 921 extends in the thickness direction of the conductor plate 20A, for example. The pillar portion 921 has a quadrangular prism shape, for example.

The beam portion 922 extends from the pillar portion 921 in the width direction of the conductor plate 20A. That is to say, one end of the beam portion 922 is joined to the pillar portion 921. The other end of the beam portion 922 is not joined to any other member. This beam portion 922 has a cantilever structure in which one end and the other end thereof serve as a fixed end and a free end, respectively. The beam portion 922 is plate-shaped, for example, and is provided in a position in which its thickness direction substantially matches the thickness direction of the conductor plate 20A, for example.

One end of the beam portion 923 is joined to the pillar portion 921 at a different location from that of the beam portion 922 in the thickness direction of the conductor plate 20A. The beam portion 923 also extends from the pillar portion 921 in the width direction of the conductor plate 20A. The beam portion 923 opposes the beam portion 922 in the thickness direction of the conductor plate 20A with a space left therebetween. The other end of the beam portion 923 is not joined to any other member. This beam portion 923 has a cantilever structure as well, in which one end and the other end thereof serve as a fixed end and a free end, respectively. The beam portion 923 is plate-shaped, for example, and is provided in a position in which its thickness direction substantially matches the thickness direction of the conductor plate 20A.

In a state in which the conductor plate 20A is inserted into the connection member 40, the conductor plate 20A is located between the pair of beam portions 922 and 923. In FIG. 6, for example, the beam portions 922 and 923 are provided with respective contact protrusions 925 and 926. The contact protrusions 925 and 926 protrude so as to approach each other. Each of the contact protrusions 925 and 926 may have a tapered shape that becomes narrower toward the conductor plate 20A, for example. In a state in which the conductor plate 20A is not inserted, the distance between the contact protrusions 925 and 926 is set to be shorter than the thickness of the conductor plate 20A.

The end portion of the conductor plate 20A is inserted into a region between the beam portions 922 and 923. As a result, the contact protrusions 925 and 926 come into contact with the conductor plate 20A from opposite sides of the conductor plate 20A. Also, as a result of the insertion, the beam portions 922 and 923 elastically deform so that the distance between the contact protrusions 925 and 926 increases. Therefore, the beam portions 922 and 923 are pressed against the conductor plate 20A in the thickness direction from the opposite sides of the conductor plate 20A. Thus, the quality of contact between the contact protrusion 925 and the conductor plate 20A as well as the quality of contact between the contact protrusion 926 and the conductor plate 20A can be improved. Moreover, the force holding the conductor plate 20A can also be increased. Note that although the connecting conductor 92 need not be pressed against the conductor plate 10A from opposite sides in the thickness direction, the force holding the conductor plate 10A can be increased even further by the connecting conductor 92 being pressed against the conductor plate 10A from opposite sides thereof.

Furthermore, the connecting conductor 92 is pressed against wide surfaces of the conductor plate 20A. For example, if the connecting conductor 92 is pressed against the conductor plate 20A in the width direction, the connecting conductor 92 is pressed against narrow surfaces of the conductor plate 20A. In the case where the connecting conductor 92 is pressed against the narrow surfaces in this manner, a high position accuracy of the pressing structure (in particular, the contact protrusions) is required in order that the connecting conductor 92 is pressed against the narrow surfaces. On the other hand, in the case where the connecting conductor 92 is pressed against the wide surfaces of the conductor plate 20A, the position accuracy of the pressing structure (in particular, the contact protrusions 925 and 926) need not be high. With this pressing configuration, it is easy to produce the connection member 40.

The connecting conductor 92 may also be pressed against the conductor plate 20B while coming into contact with the conductor plate 20B in the thickness direction, using a pressing structure that is similar to the pressing structure for the conductor plate 20A. As a specific example, the connecting conductor 92 may further include a pillar portion 921, beam portions 922 and 923, and contact protrusions 925 and 926 for the conductor plate 10B.

Moreover, referring also to FIGS. 4 and 7, the connecting conductor 92 further includes a joint portion 924. The joint portion 924 joins the pillar portion 921 for the conductor plate 20A and the pillar portion 921 for the conductor plate 20B to each other. For example, the pillar portion 921 for the conductor plate 20A and the pillar portion 921 for the conductor plate 20B oppose each other in the longitudinal direction of the conductor plates 20A and 20B with a space left therebetween. Therefore, the joint portion 924 also extends in the longitudinal direction. The joint portion 924 is plate-shaped, for example. The joint portion 924 is provided in a position in which its thickness direction substantially matches the thickness direction of the conductor plates 20A and 20B, for example.

As described above, the connecting conductor 92 electrically connects the conductor plates 20A and 20B to each other. In other words, the conductor plates 20A and 20B are electrically connected to each other via the connecting conductor 92.

Referring to FIG. 4, in the connection member 40, the connecting conductor 92 is electrically connected to the power supply terminal 612 of the fitting portion 61 and the power supply terminal 622 of the fitting portion 62. For example, the connection member 40 has a substrate 7 within the resin frame 400. The substrate 7 is disposed in a position in which, for example, its thickness direction substantially matches the thickness direction of the conductor plates 10A, 10B, 20A, and 20B. A wire 72, for example, is provided on one principal surface 7a of the substrate 7. The wire 72 is formed of a metal, for example, and may be a pattern wire, for example. The fitting portions 61 and 62 are provided on the principal surface 7a of the substrate 7, for example, and the power supply terminal 612 of the fitting portion 61 and the power supply terminal 622 of the fitting portion 62 are connected to the wire 72.

The connecting conductor 92 is provided on the principal surface 7a side of the substrate 7, and is connected to the wire 72. That is to say, it can also be said that the connecting conductor 92 electrically connects the conductor plates 20A and 20B to the substrate 7. Moreover, it can also be said that the wire 72 connects the connecting conductor 92 to the terminal 612 of the fitting portion 61 and connects the connecting conductor 92 to the terminal 622 of the fitting portion 62. For example, a portion of the joint portion 924 of the connecting conductor 92 is connected to a portion of the wire 72 directly or via a conductive member (e.g., solder, a conductive resin, or the like). As shown in FIG. 4, for example, the joint portion 924 may be provided with a protrusion 927. The protrusion 927 extends from the joint portion 924 in a direction that is parallel to the substrate 7, and a leading end portion of the protrusion 927 is connected to the wire 72. In this manner, the connecting conductor 92 is connected to the power supply terminals 612 and 622 via the wire 72, and therefore, the conductor plates 20A and 20B are electrically connected to the power supply terminals 612 and 622.

In the example in FIG. 4, the switches 41 and 42 as well as the fuses 51 and 52 are provided on the principal surface 7a side of the substrate 7. In the case where the switches 41 and 42 respectively have the coils 411 and 421, the coils 411 and 421 are connected to the conductor plate 20 at the other end as has been described above with reference to FIG. 2. In the example in FIG. 4 as well, each of the conductor plates 20A and 20B is connected to the switches 41 and 42 (specifically, coils 411 and 421) via the connecting conductor 92 and the wire 72.

Referring to FIG. 5, the connection member 40 has a connecting conductor 91. The connecting conductor 91 has conductivity, and is formed of a metal, for example. The connecting conductor 91 may be a busbar. In a state in which end portions of the conductor plates 10A and 10B are inserted into the connection member 40, the connecting conductor 91 is electrically connected to both of the conductor plates 10A and 10B. That is to say, the conductor plates 10A and 10B are electrically connected to each other via the connecting conductor 91. For example, the connecting conductor 91 may come into contact with each of the end portions of the conductor plates 10A and 10B.

Referring to FIG. 6, the connecting conductor 91 may be pressed against the conductor plate 10A in the thickness direction of the conductor plate 10A while coming into contact with the conductor plate 10A in the thickness direction. That is to say, the connecting conductor 91 may have a pressing structure. Similarly, the connecting conductor 91 may also be pressed against the conductor plate 10B in the thickness direction of the conductor plate 10B while coming into contact with the conductor plate 10B in the thickness direction. With this configuration, the quality of contact between the connecting conductor 91 and each of the conductor plates 10A and 10B can be improved. A specific example of the connecting conductor 91 is similar to that of the connecting conductor 92, and includes a pillar portion 911, beam portions 912 and 913, and contact protrusions 915 and 916.

Referring to FIGS. 4 and 5, in the connection member 40, the connecting conductor 91 is electrically connected to the power supply terminal 611 of the fitting portion 61 and the power supply terminal 621 of the fitting portion 62. Specifically, the connecting conductor 91 is connected to the power supply terminal 611 via the switch 41 and the fuse 51, and is connected to the power supply terminal 621 via the switch 42 and the fuse 52.

For example, a wire 71 is provided on the substrate 7. The wire 71 is formed of a metal, for example, and may be a pattern wire, for example. The above-described connection relationship is realized by the connecting conductor 91 being connected to this wire 71. That is to say, it can also be said that the connecting conductor 91 connects the conductor plates 10A and 10B to the substrate 7. Moreover, it can also be said that the wire 71 connects the connecting conductor 91 to the terminal 611 of the fitting portion 61 via the switch 41, and connects the connecting conductor 91 to the terminal 621 of the fitting portion 62 via the switch 42.

The connecting conductor 91 may be provided on the side opposite to the connecting conductor 92 with respect to the substrate 7. That is to say, the connecting conductor 91 may be disposed on a principal surface 7b side of the substrate 7. The principal surface 7b is a surface that is opposite to the principal surface 7a. With this configuration, the connecting conductor 91 is unlikely to spatially interfere with the connecting conductor 92, and therefore, it is easy to attach the connecting conductors 91 and 92 to the substrate 7.

In this case, a wire 71b, which is a portion of the wire 71, is formed on the principal surface 7b side of the substrate 7. For example, a portion of a joint portion 914 of the connecting conductor 91 is connected to a portion of the wire 71b directly or via a conductive member (e.g., solder, a conductive resin, or the like). The joint portion 914 joins the pillar portions 911 and 911 to each other, for example. As shown in FIG. 5, for example, the joint portion 914 may be provided with a protrusion 917. The protrusion 917 extends from the joint portion 914 in a direction that is parallel to the substrate 7, and a leading end portion of the protrusion 917 is connected to the wire 71b.

Wires 71a, which are portions of the wire 71, are formed on the principal surface 7a side of the substrate 7. The wires 71a are electrically connected to the wire 71b through vias 71c, for example. The wires 71a appropriately electrically connect the switches 41 and 42, the fuses 51 and 52, and the power supply terminals 611 and 621, which are provided on the principal surface 7a.

Next, the signal line group 30 will be described. In the example in FIGS. 3 and 4, signal line groups 30A and 30B are shown as the signal line group 30. A connector 300A is provided at one end of the signal line group 30A, and a connector 300B is provided at one end of the signal line group 30B.

The connection member 40 is provided with a fitting portion 60A. The fitting portion 60A is a PCB connector, for example, and is detachably connected to the connector 300A. The fitting portion 60A is provided in the face 400a of the resin frame 400, for example. In the example in FIG. 3, the signal line group 30A and the connector 300A are located on the side opposite to the conductor plate 10A with respect to the conductor plate 20A, and therefore, the fitting portion 60A is also provided on the side opposite to the fitting portion 411A with respect to the fitting portion 421A.

The connection member 40 is also provided with a fitting portion 60B for the connector 300B. The fitting portion 60B is a PCT connector, for example, and is provided on the face of the resin frame 400 that is opposite to the face 400a. The positional relationship among the fitting portions 411B and 421B for the conductor plates 10B and 20B and the fitting portion 60B is similar to the positional relationship among the fitting portions 411A and 421A and the fitting portion 60A.

Referring to FIG. 4, for example, the signal line group 30A contains signal lines 31A, 32A, and 33A, and the signal line group 30B contains signal lines 31B, 32B, and 33B. In a state in which the connectors 300A and 300B are coupled to the respective fitting portions 60A and 60B, for example, the signal lines 31A and 31B are connected to a control terminal (specifically, one end of the coil 411) of the switch 41. Thus, electric devices connected signal lines 31A and 31B can control the switch 41 so as to establish or break electrical continuity, using a control signal. Specifically, the fitting portions 60A and 60B are connected to the principal surface 7a of the substrate 7, and a wire 81 is formed on the principal surface 7a side of the substrate 7. The wire 81 is formed of a metal, for example, and may be a pattern wire, for example. The wire 81 electrically connects a terminal for the signal line 31A, of the fitting portion 60A, a terminal for the signal line 31B, of the fitting portion 60B, and the control terminal of the switch 41 to one another.

The signal lines 32A and 32B are connected to a control terminal (specifically, one end of the coil 421) of the switch 42 in the connection member 40. Thus, electric devices connected to the signal lines 32A and 32B can control the switch 42 so as to establish or break electrical continuity, using a control signal. For example, a wire 82 is formed on the principal surface 7a of the substrate 7. The wire 82 is formed of a metal, for example, and may be a pattern wire, for example. The wire 82 electrically connects a terminal for the signal line 32A, of the fitting portion 60A, a terminal for the signal line 32B, of the fitting portion 60B, and the control terminal of the switch 42 to one another.

The signal line 33A is connected to the signal terminal 613 of the fitting portion 61 in the connection member 40. Thus, an electric device connected to the signal line 33A can send and receive signals to and from an electric device connected to the wire 213. For example, a wire 83 is formed on the principal surface 7a side of the substrate 7. The wire 83 is formed of a metal, for example, and may be a pattern wire, for example. The wire 83 electrically connects a terminal for the signal line 33A, of the fitting portion 60A, and the signal terminal 613 of the fitting portion 61 to each other.

Wiring Module 100B

Figure 8:
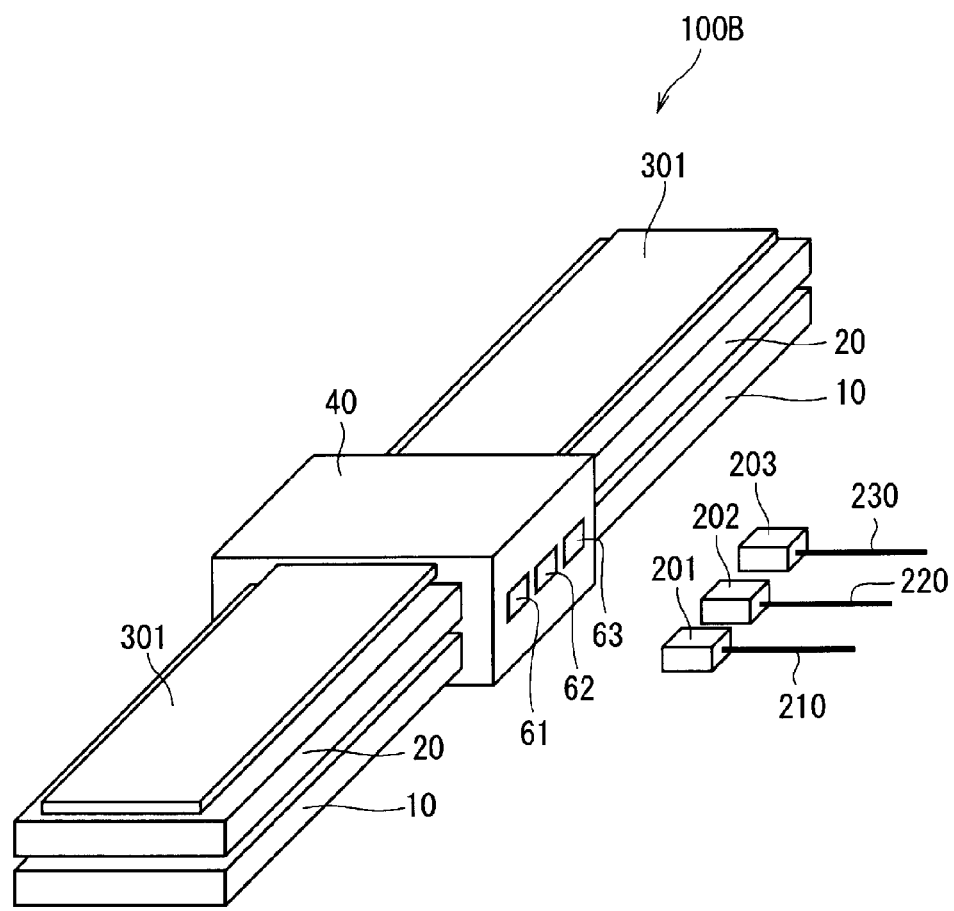
FIG. 8 is a perspective view schematically showing an example of a configuration of a wiring module.

FIG. 8 is a perspective view schematically showing an example of a configuration of a wiring module 100B. The wiring module 100B differs from the wiring module 100 in that a signal conductor plate 301 is provided instead of the signal line group 30. The signal conductor plate 301 has an elongated shape that is elongated in a longitudinal direction, and has a flat shape (e.g., a rectangular shape) in a cross section that is perpendicular to the longitudinal direction. The material of the signal conductor plate 301 is similar to those of the conductor plates 10 and 20.

For example, the signal conductor plate 301 may be disposed in a position in which its thickness direction substantially matches the thickness direction of the conductor plates 10 and 20. For example, the signal conductor plate 301 may be provided on the side opposite to the conductor plate 10 with respect to the conductor plate 20. Moreover, the signal conductor plate 301 may extend in the longitudinal direction of the conductor plates 10 and 20. That is to say, the longitudinal direction of the signal conductor plate 301 may substantially match the longitudinal direction of the conductor plates 10 and 20. The signal conductor plate 301 is spaced apart from the conductor plates 10 and 20. The signal conductor plate 301 may also be coated with an insulating coating as appropriate. The signal conductor plate 301 transmits a signal (hereinafter, referred to as "multiplex signal") into which a plurality of signals are multiplexed.

Figure 9:
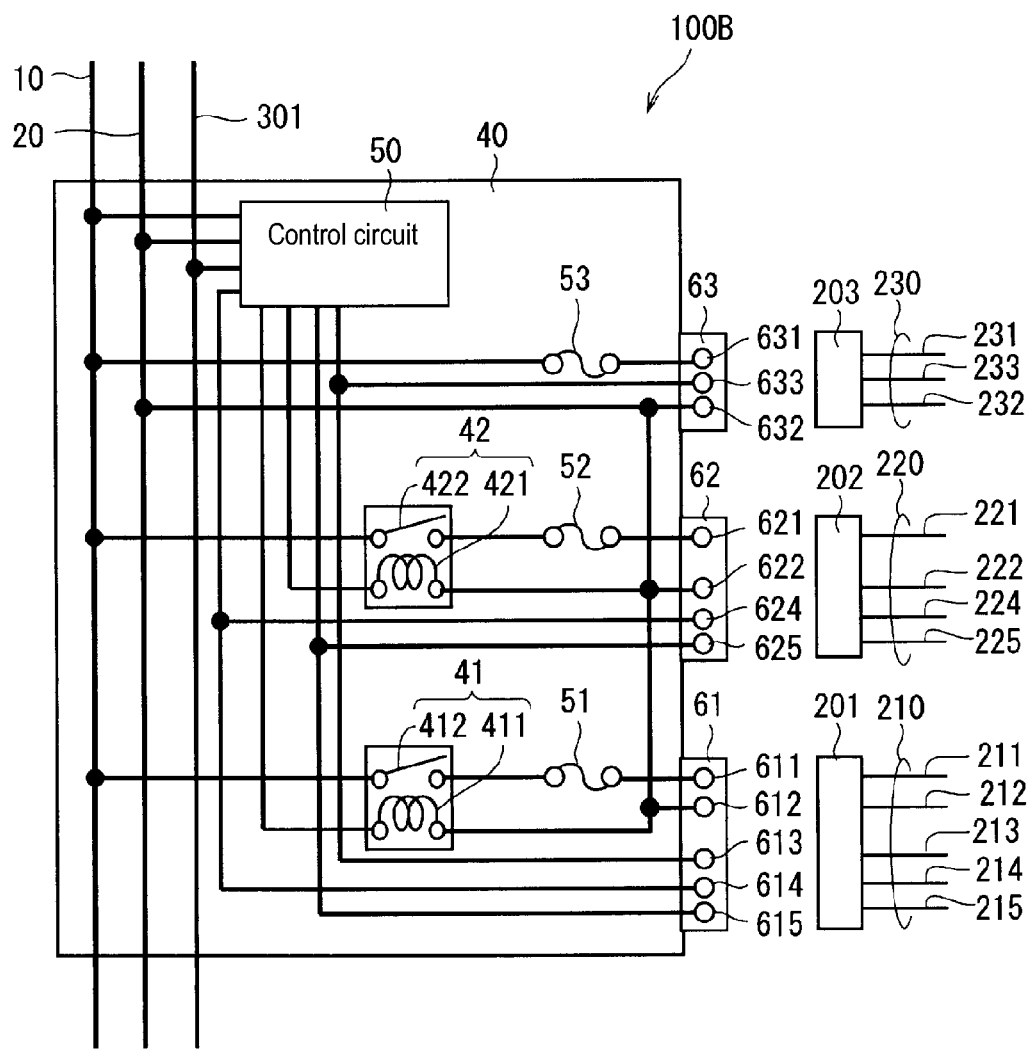
FIG. 9 is a diagram schematically showing an example of an internal configuration of the wiring module.

The connection member 40 is attached to the conductor plates 10 and 20 as well as the signal conductor plate 301. FIG. 9 is a diagram schematically showing an example of an internal configuration of the connection member 40. The connection member 40 includes, for example, the switches 41 and 42, the fuses 51 and 53, the fitting portions 61 to 63, and a control circuit 50. Here, the differences from the wiring module 100 will be described. The control circuit 50 is connected to the conductor plates 10 and 20 and receives electric power from the power storage device 500 via these conductor plates. The control circuit 50 operates using the received electric power. Moreover, the control circuit 50 is also connected to the signal conductor plate 301. The control circuit 50 receives a multiplex signal from the signal conductor plate 301, analyzes the multiplex signal, and separates individual signals. The multiplex signal contains control signals for controlling the switches 41 and 42 so as to establish or break electrical continuity.

The control circuit 50 is connected to the control terminals of the respective switches 41 and 42. When a multiplex signal contains a control signal of the switch 41, the control circuit 50 outputs this control signal to the control terminal (more specifically, one end of the coil 411) of the switch 41. Similarly, when a control signal of the switch 42 is contained in a multiplex signal, the control circuit 50 outputs this control signal to the control terminal (more specifically, one end of the coil 421) of the switch 42.

A multiplex signal also contains, for example, signals to be sent to electric devices. The control circuit 50 is connected to the signal terminals 613 to 615 of the fitting portion 61, the signal terminals 624 and 625 of the fitting portion 62, and the signal terminal 633 of the fitting portion 63. When signals to be output to these signal terminals are contained in a multiplex signal, the control circuit 50 appropriately outputs those signals to these terminals.

With this configuration, it is possible to realize similar functions to those of the wiring module 100 while using the signal conductor plate 301. In addition, when the signal conductor plate 301 is used, it is easy to perform routing because it is sufficient that the conductor plates 10 and 20 and the signal conductor plate 301 are laid one on top of another in the thickness direction. Note that the width of the signal conductor plate 301 may be narrower than the widths of both of the conductor plates 10 and 20. In this case, it is easy to dispose the signal conductor plate 301 on the conductor plates 10 and 20.

Plurality of Connection Members

In a case where a plurality of connection members 40 are provided, electric devices to be connected to the individual connection members 40 may be determined for each vehicle grade or for each vehicle type, for example. With this configuration, unnecessary wire groups for components not installed in the vehicle can be reduced.

The configurations that have been described in the foregoing embodiments and modifications can be combined as appropriate unless being inconsistent with one another.

Although the wiring module has been described in detail above, the foregoing description is to be considered in all respects as illustrative, and this wiring module is not limited to the foregoing description. It should be understood that innumerable modifications that are not described herein can be envisaged without departing from the scope of this wiring module.

The invention claimed is:

1. A wiring module for installation in a vehicle having a power storage device having a first output terminal for providing power to an electric device, the wiring module comprising:
   a first conductor plate that is connected to the first output terminal of the power storage device, the first conductor plate is formed of a flat electric conductor elongated in a longitudinal direction, the first conductor plate supplying electric power from the power storage device to the electric device;
   a connection member that is fitted to the first conductor plate,
      the connection member having:
         a first fitting portion that is fitted to the first conductor plate;
         a second fitting portion that has a first terminal through which the electric power is supplied to the electric device; and
         a switch that establishes and breaks electrical continuity between the first terminal and the first conductor plate;
   a second conductor plate that is connected to a second output terminal of the power storage device and formed of a flat electric conductor elongated in a longitudinal direction, and
   the second fitting portion further has a second terminal through which the electric power is supplied to the electric device,
   the connection member further includes a third fitting portion that is fitted to the second conductor plate, and
   the second conductor plate is connected to the second terminal in the connection member.

2. The wiring module according to claim 1, further comprising:
   a first signal line that extends in the longitudinal direction,
   wherein the first signal line is coupled to the connection member, and
   the first signal line is connected to a control terminal of the switch in the connection member.

3. The wiring module according to claim 1, further comprising:
a second signal line,
wherein the second fitting portion has a third terminal from which a signal is output to the electric device, and
the connection member further has a wire that connects the second signal line and the third terminal to each other.

4. The wiring module according to claim 1, further comprising:
a flat signal conductor plate that extends in the longitudinal direction,
wherein the signal conductor plate transmits a multiplex signal that is multiplexed, and
the connection member has a control circuit that is connected to the signal conductor plate and that separates the multiplex signal.

5. The wiring module according to claim 1, further comprising:
wherein the second conductor plate is laid on top of the first conductor plate in an insulated state.

6. The wiring module according to claim 5,
wherein the connection member has:
a substrate;
a first connecting conductor that is connected to the first conductor plate; and
a second connecting conductor that is disposed on a side opposite to the first connecting conductor with respect to the substrate and is connected to the second conductor plate, and
the substrate has:
a first wire that connects the first connecting conductor to the first terminal of the second fitting portion via the switch; and
a second wire that connects the second connecting conductor to the second terminal of the second fitting portion.

7. The wiring module according to claim 5, further comprising:
a first signal line that extends in the longitudinal direction,
wherein the first signal line is provided at a location other than a space sandwiched between the first conductor plate and the second conductor plate,
the first signal line is coupled to the connection member, and
the first signal line is connected to a control terminal of the switch in the connection member.

8. The wiring module according to claim 7,
wherein the first signal line is disposed in contact with an outer surface of the first conductor plate, an outer surface of the second conductor plate, an outer surface of an insulator with which the first conductor plate is coated, or an outer surface of an insulator with which the second conductor plate is coated.

9. The wiring module according to claim 7,
wherein the first signal line is disposed spaced apart from an outer surface of the first conductor plate, an outer surface of the second conductor plate, an outer surface of an insulator with which the first conductor plate is coated, or an outer surface of an insulator with which the second conductor plate is coated.

10. The wiring module according to claim 1,
wherein the connection member further has:
a first connecting conductor that is connected to the first conductor plate,
the first connecting conductor is connected to the first terminal of the second fitting portion via the switch, and
the first connecting conductor presses the first conductor plate in a thickness direction of the first conductor plate while coming into contact with the first conductor plate in the thickness direction.

11. The wiring module according to claim 10,
wherein the first connecting conductor includes:
a pillar portion that extends in the thickness direction; and
a pair of beam portions that extend from the pillar portion in a width direction of the first conductor plate and oppose each other in the thickness direction with a space left therebetween,
the pair of beam portions have respective contact protrusions that protrude so as to approach each other, and
the contact protrusions come into contact with the first conductor plate from opposite sides in the thickness direction.

12. The wiring module according to claim 1, further comprising:
a third conductor plate formed of a flat conductor plate that is paired with the first conductor plate,
wherein the connection member further has a fourth fitting portion that is fitted to the third conductor plate.

13. The wiring module according to claim 12,
wherein the connection member further has a first connecting conductor that connects the first conductor plate to the third conductor plate.

14. The wiring module according to claim 13,
wherein the first connecting conductor comes into contact with and presses the third conductor plate in a thickness direction of the third conductor plate.

15. A connection member for an in-vehicle wiring module that supplies electric power from a power storage device to an electric device, the connection member comprising:
a first fitting portion that is fitted to a first conductor plate that is connected to a first output terminal of the power storage device and formed of a flat electric conductor elongated in a longitudinal direction;
a second fitting portion that has a first terminal through which electric power is supplied to the electric device;
a switch that establishes and breaks electrical continuity between the first terminal and the first conductor plate; and
a second conductor plate that is connected to a second output terminal of the power storage device and formed of a flat electric conductor elongated in a longitudinal direction, and
the second fitting portion further has a second terminal through which the electric power is supplied to the electric device,
the connection member further includes a third fitting portion that is fitted to the second conductor plate, and
the second conductor plate is connected to the second terminal in the connection member.

* * * * *